(12) United States Patent
Kori

(10) Patent No.: US 6,212,325 B1
(45) Date of Patent: Apr. 3, 2001

(54) METHOD AND APPARATUS FOR PROCESSING VIDEO SIGNAL AND STORAGE MEDIUM

(75) Inventor: Teruhiko Kori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/946,961

(22) Filed: Oct. 8, 1997

(30) Foreign Application Priority Data

Oct. 15, 1996 (JP) .................................................... 8-272716
Oct. 31, 1996 (JP) .................................................... 8-290954

(51) Int. Cl.⁷ .................................................... H04N 9/79
(52) U.S. Cl. ................................ 386/1; 386/94; 380/201; 380/213
(58) Field of Search ........................... 386/1, 94; 360/60; 380/5, 10, 15, 201, 213, 219, 221; H04N 5/76, 5/92, 9/79

(56) References Cited

U.S. PATENT DOCUMENTS

| | | | |
|---|---|---|---|
| 5,784,523 | * | 7/1998 | Quan et al. ............................. 386/94 |
| 5,940,134 | * | 8/1999 | Wirtz ...................................... 386/94 |
| 5,982,977 | * | 11/1999 | Naruse et al. .......................... 386/94 |
| 6,035,094 | * | 3/2000 | Kori ....................................... 386/94 |
| 6,041,158 | * | 3/2000 | Sato ....................................... 386/94 |

FOREIGN PATENT DOCUMENTS 0 710 020   5/1996   (EP) .

* cited by examiner

Primary Examiner—Thai Tran
(74) Attorney, Agent, or Firm—Frommer Lawrence & Haug, LLP.; William S. Frommer; Joe H. Shallenburger

(57) ABSTRACT

A video signal processing apparatus, a video signal processing method and a recording medium are provided for reliably preventing illegal copy through a VTR and supplying a high-quality video signal with a copyright protecting function without interfering with an image displayed on a TV set. A color burst signal generating unit and a signal selector are controlled by a timing generator in a color stripe sequence. The color burst signal generating unit is controlled to output at least two of a U-axis inverted burst signal UI produced by inverting a U-axis component of a burst phase, a V-axis inverted burst signal VI produced by inverting a V-axis component of the burst phase, and a both-axes inverted burst signal I produced by inverting the U-axis/V-axis as a color stripe signal with a copyguard function. Then, the signal selector operates to add the color stripe signal to color difference signals U and V as a copyguard signal in place of a normal color burst signal.

12 Claims, 13 Drawing Sheets

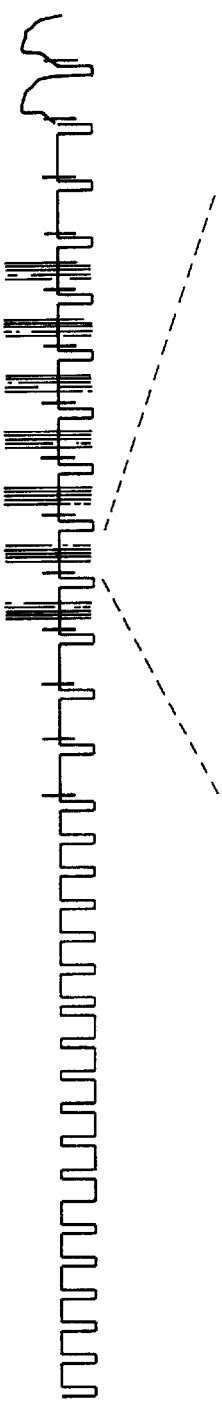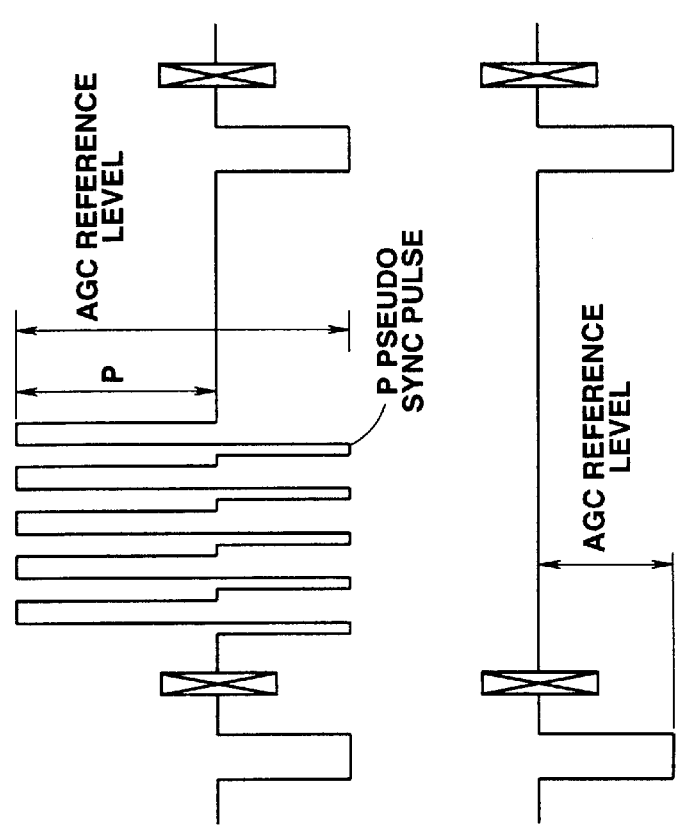
FIG.1A  FIG.1B  FIG.1C

| CGMS | | DEFINITION |
|---|---|---|
| 1 | 1 | COPY DISENABLED |
| 1 | 0 | ONE-GENERATION COPY DISABLED |
| 0 | 1 | UNUSED |
| 0 | 0 | COPY ENABLED |

| FLAG | | DEFINITION |
|---|---|---|
| 0 | 0 | NO GENERATION OF SIGNAL FOR LIMITING AN ANALOG COPY |
| 0 | 1 | GENERATION OF AGC SIGNAL ONLY |
| 1 | 0 | GENERATION OF AGCF SECOND COPY GUARD SIGNAL |
| 1 | 1 | GENERATION OF AGC+FIRST COPY GUARD SIGNAL |

METHOD AND APPARATUS FOR PROCESSING VIDEO SIGNAL AND STORAGE MEDIUM

BACKGROUND OF THE INVENTION

1. Field of the Invention

The present invention relates to a method and an apparatus for processing a video signal and a recording medium which are arranged to reliably protect a copyright of a high-quality video signal obtained from a video disk, a digital VCR, or a receiving unit for a digital broadcast.

2. Description of the Related Art

With advance of digital technology, people are likely to easily obtain a high-quality video signal at home. For example, a pre-recorded tape (video tape package) as well as a digital broadcasting receiving terminal and a digital video disk supply a high-quality video signal.

The supplier of the high-quality video signal adds a copyguard signal to the video signal for protecting the copyright of a program represented by the video signal. This copyguard signal inhibits recording of the program with a video tape recorder (VTR). For example, the copyguard signal employs two kinds of systems called a pseudo horizontal synchronous pulse and a color stripe supplied by the Macrovision Corporation.

For realizing a copyguard function, as shown in FIG. 1, the system called the pseudo horizontal synchronous pulse is arranged to insert a pseudo horizontal synchronous pulse in the vertical blanking interval of the video signal for putting an AGC (Automatic Gain Control) circuit of the VTR to an erroneous operating state and thereby degrading the image quality to an impracticable level. For the same purpose, as shown in FIG. 2, the system called the color stripe is arranged to invert a phase of 2 to 4 lines of a color burst signal at every 20 lines, for example, for inverting the color of the image reproduced by the VTR and thereby degrading the image quality to an impracticable level.

By the way, all the influence of the copyguard signal for inhibiting to record the high-quality video signal at home is disallowed to be assured in the TV market. It means that the copyguard signal may interfere with the market of a certain TV set.

That is, in general, the TV set provides a relatively large time constant and a narrow frequency response range of an APC (Automatic Phase Control) circuit used for forming a carrier wave for color demodulation based on a color burst signal. If, therefore, the color stripe system inverts the phase of the four consecutive lines of the color burst signal at every about 20 lines, it gives no influence to the color demodulation. However, some TV sets may provide a small time constant and a wide frequency response range of the APC circuit. In those TV sets, the hue-inverted band appears on the screen.

SUMMARY OF THE INVENTION

It is therefore an object of the present invention to provide a method and an apparatus for processing a video signal and a storage medium which are arranged to reliably prevent copying of a video signal by a VTR without interfering with the image display on the TV set and thereby supply a high-quality video signal with a high copyguard function.

An apparatus for processing a video signal according to the present invention includes: a signal generating unit for generating a copyguard signal; a selector for replacing a color burst signal of the video signal with the copyguard signal; and wherein the signal generating unit operates to generate the copyguard signal composed of at least two kinds of modulations of a burst phase, the copyguard signal having a different phase from an original phase of the color burst signal of the video signal.

In the apparatus for processing a video signal according to the present invention, the signal generating unit operates to alternately output a U-axis inverted burst signal produced by inverting a U-axis component of the burst phase and a V-axis inverted burst signal produced by inverting a V-axis component of the burst phase as the copyguard signal at each horizontal scanning period. The signal generating unit operates to alternately output a one-axis inverted burst signal produced by inverting one of a U-axis component and a V-axis component of the burst phase and a V-axis inverted burst signal produced by inverting a V-axis component as the copyguard signal at each horizontal scanning period. The signal generating unit operates to sequentially output a U-axis inverted burst signal produced by inverting a U-axis component of the burst phase, a V-axis inverted burst signal produced by inverting a V-axis component of the burst phase, and a both-axes inverted burst signal produced by inverting both of the U-axis/V-axis as the copyguard signal at each horizontal scanning period.

In the apparatus for processing a video signal according to the present invention, the selector operates to replace all of the color burst signal with the copyguard at each horizontal scanning period. The selector operates to replace part of the color burst signal with the copyguard signal at each horizontal scanning period. The selector operates to replace the color burst signal with the copyguard signal at each alternate horizontal scanning period with one middle horizontal scanning period of the normal burst phase laid therebetween.

A method for processing a video signal according to the present invention includes the steps of generating a copyguard signal composed of at least two kinds of modulations of a burst phase, the copyguard signal having a different phase from an original phase of the color burst signal of the video signal; and; replacing the color burst signal of the video signal with the copyguard signal.

In the method for processing a video signal according to the present invention, at least two of a U-axis inverted burst signal produced by inverting a U-axis component of the burst phase, a V-axis inverted burst signal produced by inverting a V-axis component of the burst signal, and a both-axes inverted burst signal produced by inverting the U-axis/V-axis components are selected as the copyguard signal at each horizontal scanning period and then each of the inverted burst signals is exchanged with the color burst signal of the video signal. In the method for processing a video signal according to the present invention, the copyguard signal is exchanged with part or all of the color burst signal at each horizontal scanning period. Further in the method for processing a video signal according to the present invention, the copyguard signal is exchanged with the color burst signal at each alternate horizontal scanning period with one middle horizontal scanning period of the normal burst phase laid therebetween.

A recording medium according to the present invention includes a recording area for recording a video signal and a control area for recording control information for copyguarding a video signal reproduced from the recording area and is characterized in that the control area records control information for specifying selection of at least two of a U-axis inverted burst signal produced by inverting a U-axis component of a burst phase, a V-axis inverted burst signal produced by inverting a V-axis component, and a both-axes inverted burst signal produced by inverting a U-axis/V-axis as a copyguard signal at each horizontal scanning period and specifying replacement of the color burst signal of the video signal with the copyguard signal.

BRIEF DESCRIPTION OF THE DRAWINGS

Other objects, features, and advantages of the present invention will be apparent from the written description and the drawings in which:

FIGS. 1A to 1C are a view for explaining a copyguard function of a pseudo horizontal synchronous pulse system;

DESCRIPTION OF THE PREFERRED EMBODIMENTS

Later, the description will be oriented to a method and an apparatus for processing a video signal and a recording medium according to an embodiment of the present invention with reference to the appended drawings.

Figure 2:
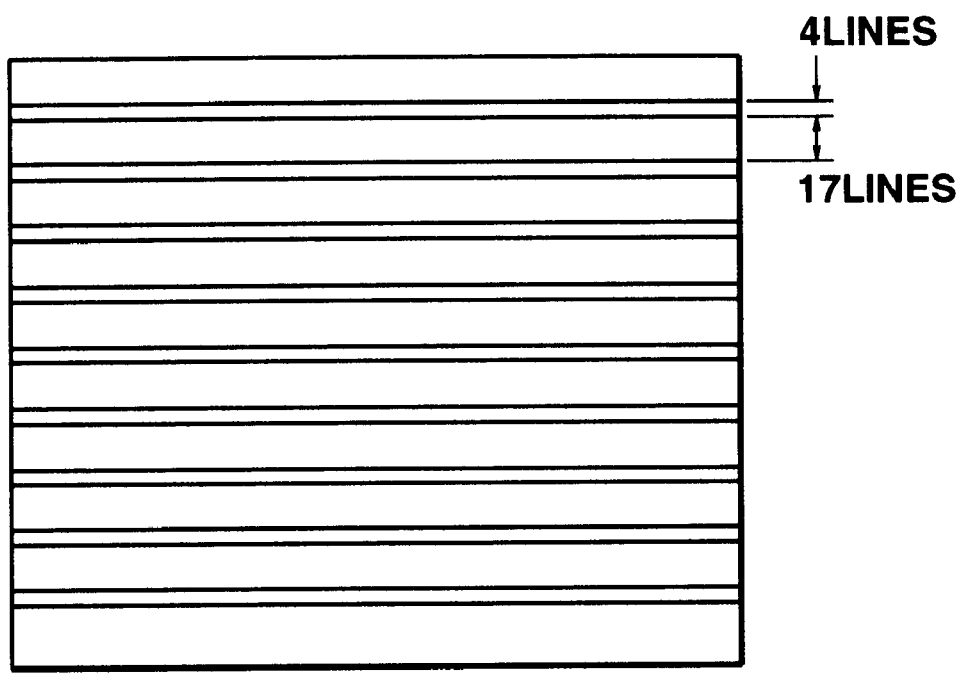
FIG. 2 is a view for explaining a copyguard function of a color stripe system.
Figure 3:
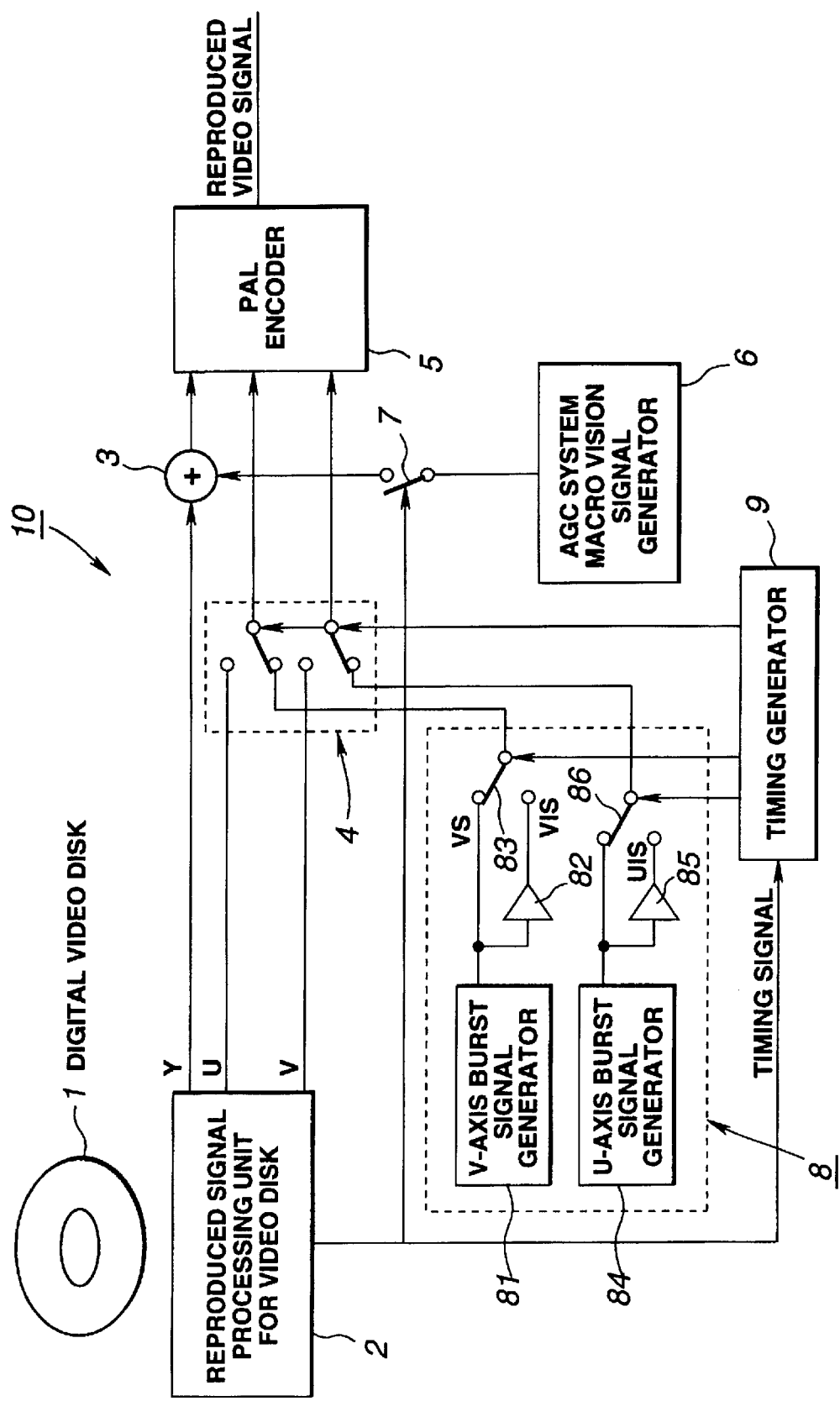
FIG. 3 is a block diagram showing an arrangement of a digital video disk player to which the present invention applies.

The present invention is applied to a digital video disk player 10 arranged as shown in FIG. 3, for example. This digital video disk player 10 is used for reproducing a video signal of a PAL system or a PAL plus system adopted in Europe from the digital video disk 1 where a video signal is recorded. The digital video disk player 10 includes a reproduced signal processing unit 2 for performing a predetermined signal treatment with respect to a reproduced signal optically read from the digital video disk 1 for generating a luminance signal Y and color difference signals U and V, and an encoder 5 for being inputted with the luminance signal Y from the reproduced signal processing unit 2 through an adder 3 and the color difference signals U and V through a signal selector 4. The luminance signal Y and the color difference signals U and V generated by the reproduced signal processing unit 2 are converted into the video signal of the PAL system or the PAL plus system through the effect of the encoder 5 and then the resulting video signal is outputted from the digital video disk player 10.

The digital video disk player 10 provides a function of adding two kinds of signals called a pseudo horizontal synchronous pulse and a color stripe as a function of protecting a copyright of a video signal recorded on the digital video disk 1. The digital video disk player 10 provides a macro vision signal generating unit 6 and a color burst signal generating unit 8. The macro vision signal generating unit 6 supplies a pseudo horizontal pulse to the adder 3 through a switch 7. The adder 3 operates to add the luminance signal Y generated by the reproduced signal processing unit 2 to the pseudo horizontal synchronous pulse. The signal selector 4 operates to add the color stripe signal supplied from the color burst signal generating unit 8 to the color difference signals U and V.

The color burst signal generating unit 8 and the signal selector 4 are controlled by a timing generator 9. The timing generator 9 and the switch 7 are controlled on the control information for copyguard reproduced from the reproduced signal processing unit 2.

The digital video disk 1 corresponds to a recording medium according to the present invention. The recording medium includes a recording area for recording a video signal and a control area for recording the control information for copyguarding the video signal reproduced from the recording area. The control information for copyguarding the video signal and the control information about limitation of a copy generation defined in FIG. 4A (CGMS: Copy Generation Management System) are recorded on the control area.

Figures 4A, 4B, 5:
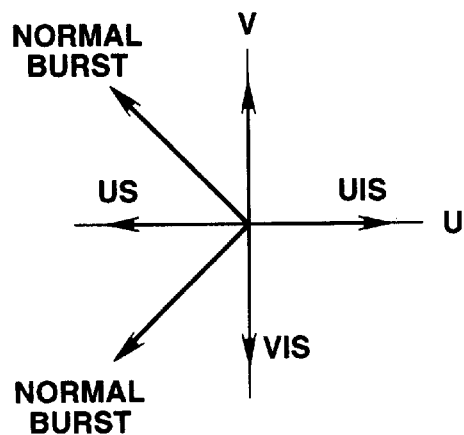
FIGS. 4A and 4B are tables for listing definition contents of control information about limitation of a copy generation recorded as control information for copyguard for a video signal of a digital video disk reproduced by a digital video disk player.
FIG. 5 is a view showing a normal color burst signal of a PAL system outputted from a color burst signal generating unit provided in the digital video disk player.

If this CGMS regulates only the limitation of digital copy, a flag indicating whether or not an analog copy is enabled, that is, trigger bits for indicating occurrence of an analog copy limiting signal may be additionally regulated. FIG. 4B shows an example of the flag. In this example, if the trigger bit is "00", it indicates no analog copy limiting signal takes place, while if the trigger bits are "01", it indicates that the pseudo horizontal synchronous pulse of the analog copy limiting signal takes place. If the trigger bits are "11", it indicates that both of the pseudo horizontal synchronous pulse and the copyguard signal according to the invention takes place. The trigger bits "10" may be set to an undefined state. As shown in FIG. 4B, the trigger bit "10" may be set to indicate the occurrence of the pseudo horizontal synchronous pulse and the other copyguard signal according to the present invention.

If the trigger bits of the CGMS reproduced from the digital video disk 1 are "00", the reproduced signal processing unit 2 keeps the switch 7 to an open state. The color burst signal generating unit 8 and the signal selector 4 are controlled by the timing generator 9 to add the normal color burst signal to the color difference signals U and V generated by the reproduced signal processing unit 2. The color burst signal generating unit 8 operates to output a normal color burst signal of the PAL system under the control on the normal sequence of the timing generator 9. The signal selector 4 is controlled by the timing generator 9 so that the color burst signal supplied from the color burst signal generating unit 8 is inserted into the given burst intervals of the color difference signals U and V supplied from the reproduced signal processing unit 2. In this state, since the switch 7 is opened, the adder 3 outputs the luminance signal Y without having to add the pseudo horizontal synchronous pulse from the macro vision signal generating unit 6 to the luminance signal y generated by the reproduced signal processing unit 2.

If the trigger bits of the CGMS are "00", the encoder 5 is inputted with the luminance signal Y generated by the reproduced signal processing unit 2 and the color difference signals U and V with the normal color burst signal added thereto. As a result, the encoder 5 outputs the normal video signal that is not subject to the analog copy limiting treatment.

If the trigger bits of the CGMS reproduced from the digital video disk 1 are "01", the switch 7 is controlled to a closed state so that the macro vision signal generating unit 6 supplies the pseudo horizontal synchronous pulse to the adder 3 through the switch 7. The color burst signal generating unit 8 and the signal selector 4 are controlled by the timing generator 9 so that the normal color burst signal is added to the color difference signals U and V generated by the reproduced signal processing unit 2. The color burst signal generating unit 8 is controlled on the normal sequence by the timing generator 9 to output the normal color burst signal of the PAL system. The signal selector 4 is controlled by the timing generator 9 so that the color burst signal supplied from the color burst signal generating unit 8 is inserted into the given burst intervals of the color difference signals U and V supplied from the reproduced signal processing unit 2. By closing the switch 7, the adder 3 operates to insert the pseudo horizontal synchronous pulse supplied from the macro vision signal generating unit 6 into the vertical blanking interval of the luminance signal Y generated by the reproduced signal processing unit 2.

If the trigger bits of the CGMS are "01", the encoder 5 is inputted with the luminance signal where the pseudo horizontal synchronous pulse is inserted in the vertical blanking interval and the color difference signals U and V to which the normal color burst signal is added. Then, the encoder 5 outputs the video signal that is subject to the analog copy limiting treatment of the pseudo horizontal synchronous pulse system.

If the trigger bits of the CGMS reproduced from the digital video disk 1 are "11", the switch 7 is controlled to a closed state so that the macro vision signal generating unit 6 supplies the pseudo horizontal synchronous pulse to the adder 3 through the switch 7. At a time, the color burst signal generating unit 8 and the signal selector 4 are controlled by the timing generator 9 so that the color burst signal having the inverted phase of the specific scan lines is added to the color difference signals U and V generated by the reproduced signal processing unit 2. The color burst signal generating unit 8 is controlled in the color stripe system sequence by the timing generator 9 so that the generating unit 8 can output the color burst signal having the inverted phases of the specific scan lines (referred to as a color stripe signal). The signal selector 4 is controlled by the timing generator 9 so that the color stripe signal supplied from the color burst signal generating unit 8 is inserted to the predetermined burst intervals of the color difference signals U and V supplied from the reproduced signal processing unit 2. Further, by closing the switch 7, the adder 3 operates to insert the pseudo horizontal synchronous pulse supplied from the macro vision signal generating unit 6 into the vertical blanking interval of the luminance signal Y generated by the reproduced signal processing unit 2.

Hence, if the trigger bits of the CGMS are "11", the encoder 5 is inputted with the luminance signal Y in which the pseudo horizontal synchronous pulse is inserted in the vertical blanking interval and the color difference signals U and V to which the color stripe signal is added. As a result, the encoder 5 outputs the video signal that is subject to the analog copy limiting treatment of the pseudo horizontal synchronous pulse system and the analog copy limiting treatment of the color stripe system.

The color burst signal generating unit 8 is arranged to have a U-axis burst signal generator 81 for generating a burst signal US corresponding to a U-axis phase component of the color burst signal added to the video signal of the PAL system, a first phase inverting circuit 82 for supplying a U-axis inverting burst signal UIS produced by inverting the phase of the U-axis burst signal US, a first selecting switch 83 for selectively outputting the U-axis burst signal US and the U-axis inverted burst signal UIS, a V-axis burst signal generator 84 for generating a burst signal VS of the V-axis phase component, a second phase inverting circuit 85 for supplying a V-axis inverted burst signal produced by inverting the phase of the V-axis burst signal VS, and a second selecting switch 86 for selectively supplying the V-axis burst signal VS and the V-axis inverted burst signal VIS. The first and the second selecting switches 83 and 86 are controlled as follows by the timing generator 9.

That is, the timing generator 9 controls the first selecting switch 83 for selecting the burst signal US from the U-axis burst signal generator 81 under the control in the normal sequence where the color burst signal generator 8 outputs the normal color burst signal of the PAL system. At a time, the timing generator 9 controls the second selecting switch 86 so that the burst signal VS from the V-axis burst signal generator 84 and the burst signal VIS from the second phase inverting circuit 85 are alternately selected at each horizontal scanning period. The color burst signal generating unit 8 is thereby operated to output the burst signal US of the U-axis phase component from the U-axis burst signal generator 81 at each horizontal scanning period. Further, the burst signal VS of the V-axis phase component from the V-axis burst signal generator 84 and the burst signal VIS of the V-axis inverted phase component from the second phase inverting circuit 85 are alternately outputted at each horizontal scanning period. The combination of the burst signal US of the U-axis phase component outputted from the color burst signal generating unit 8 at each horizontal scanning period and the burst signal VS of the V-axis phase component and the inverted burst signal VIS alternately outputted at each horizontal scanning period results in producing a normal color bust signal of the PAL system as shown in FIG. 5.

In the color stripe system sequence on which the color burst signal generating unit 8 outputs a color stripe signal produced by inverting the phase of the color burst signal of the PAL system on the specific scanning line, the timing generator 9 operates to invert the selecting states of the first and/or second selecting switches 83 and/or 86 at the horizontal scanning period corresponding to the specific scanning line.

Figure 6A:
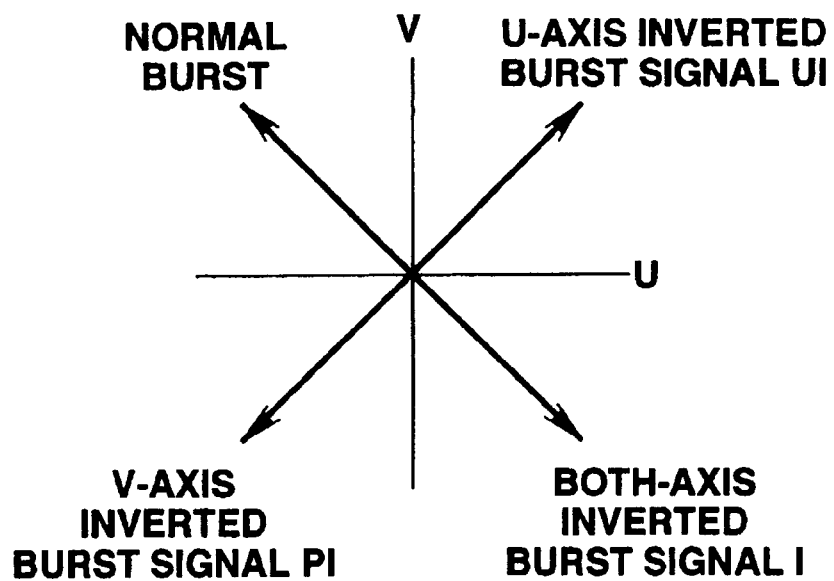
FIGS. 6A and 6B is a view showing each kind of inverted burst signal outputted as a color stripe signal in a specific line from a color burst signal generating unit.

For example, as shown in FIG. 6A, in the normal sequence, on the scanning line where the burst signal US of the U-axis phase component and the burst signal VS of the V-axis phase component are selected, at the horizontal scanning period corresponding to the specific scanning line, the selecting state of the first selecting switch 83 is inverted for selecting the burst signal VIS produced by inverting the phase of the burst signal of the V-axis phase component. By this, in place of the color burst signal in the normal sequence, the V-axis inverted burst signal PI is allowed to be outputted as the color stripe signal. By inverting the selecting state of the second selecting switch for selecting the burst signal UIS produced by inverting the phase of the U-axis phase component burst signal VS, the U-axis inverted burst signal UI is allowed to be outputted as the color stripe signal. By inverting both of the selecting states of the first and the second selecting switches 83 and 86 for selecting the burst signal VIS produced by inverting the phase of the burst signal VS of the V-axis phase component and the burst signal UIS produced by inverting the phase of the burst signal VS of the U-axis phase component, in place of the color burst signal in the normal sequence, the both inverted burst signal I is allowed to be outputted as the color stripe signal.

Figure 6B:
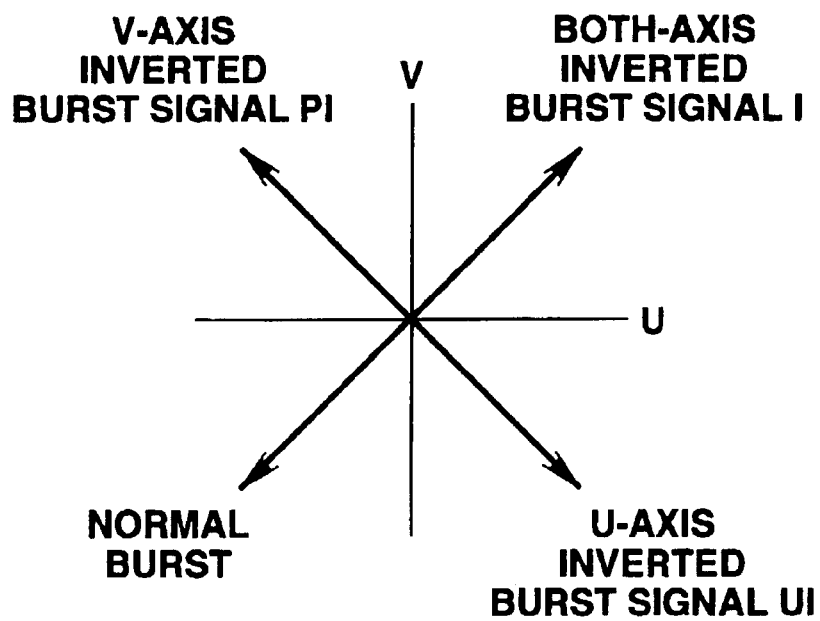

For example, as shown in FIG. 6B, in the normal sequence, on the scanning line where the burst signal VIS by inverting the phase of the burst signal VS of the V-axis phase component, and the burst signal US of the U-axis phase component, are selected, at the horizontal scanning period corresponding to the specific scanning line, by inverting the selecting state of the first selecting switch 83 for selecting the burst signal VS of the V-axis phase component, in place of the color burst signal in the normal sequence, the V-axis inverted burst signal PI is allowed to be outputted as the color stripe signal. Further, by inverting the selecting state of the second selecting switch 86 and selecting the burst signal UIS produced by inverting the phase of the burst signal US of the U-axis phase component, the U-axis inverted burst signal UI is allowed to be outputted as the color stripe signal. Further, by inverting both of the selecting states of the first and the second selecting switches 83 and 86 for selecting the burst signal produced by inverting the phase of the V-axis phase component burst signal and the burst signal UIS produced by inverting the phase of the U-axis phase component burst signal US, in place of the color burst signal in the normal sequence, the both-axes inverted burst signal I is allowed to be outputted as the color stripe signal.

The color burst signal generating unit 8 and the timing generator 9 are served as means for generating a copyguard signal used in the video signal processing apparatus according to the present invention. The unit 8 and the generator 9 are served to output as the copyguard color stripe signal at least two kinds of the U-axis inverted burst signal, the V-axis inverted burst signal PI produced by inverted the V-axis component, and the both-axes inverted burst signal I produced by inverting the U axis and the V axis. The color stripe signal, that is, the copyguard signal obtained by controlling the color burst signal generating unit 8 on the color stripe system sequence is added to the color difference signals U and V through the effect of the signal selector 4 in place of the normal color burst signal. That is, the timing generator 9 and the signal selector 4 are served as means for replacing the color burst signal with the copyguard signal used in the video signal processing apparatus.

Figure 7:
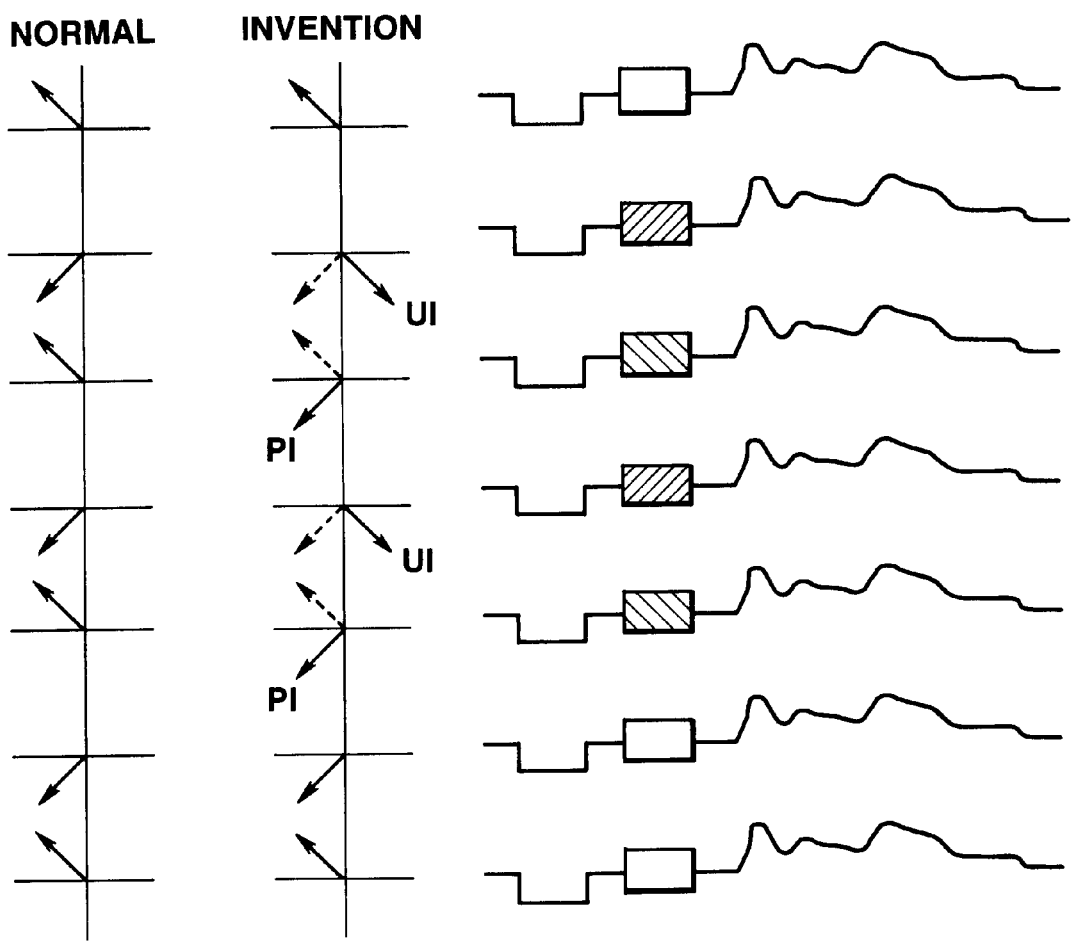
FIG. 7 is a view showing concrete sequences for outputting color stripe signals on a specific line from the color burst signal generating unit.

In the digital video disk player 10, the timing generator 9 controls the color burst signal generating unit 8 based on the color stripe system sequence for outputting the color stripe signal produced by alternating outputting the U-axis inverted burst signal UI and the V-axis inverted burst signal PI at every specific four lines as shown in FIG. 7. The specific four lines are located at intervals of about ten to forty lines.

As described above, the digital video disk player 10 provides a capability of adding to the color difference signals U and V the color stripe signal composed of an alternate repetition of the U-axis inverted burst signal UI and the V-axis inverted burst signal PI on the specific four lines located at intervals of about ten to forty lines. That is, the color stripe signal is added in place of the normal color burst signal. This color stripe signal serves to reliably prevent illegal copy of a program with the VTR and supply a high-quality video signal with a copyguard function without having to interfere with the image displayed on the TV set. Further, there exists some kinds of digital video disks 1 which are arranged to record on the control area the control information for specifying the addition of the color stripe signal composed of the alternate repetition of the U-axis inverted burst signal UI and the V-axis inverted burst signal PI in place of the normal color burst signal on the specific four lines located at intervals of about ten to forty lines. Those kinds of digital video disks 1 provide a capability of supplying a high-quality video signal with a copyguard function through the VTR without having to interfere with the image displayed on the TV set.

Figure 8:
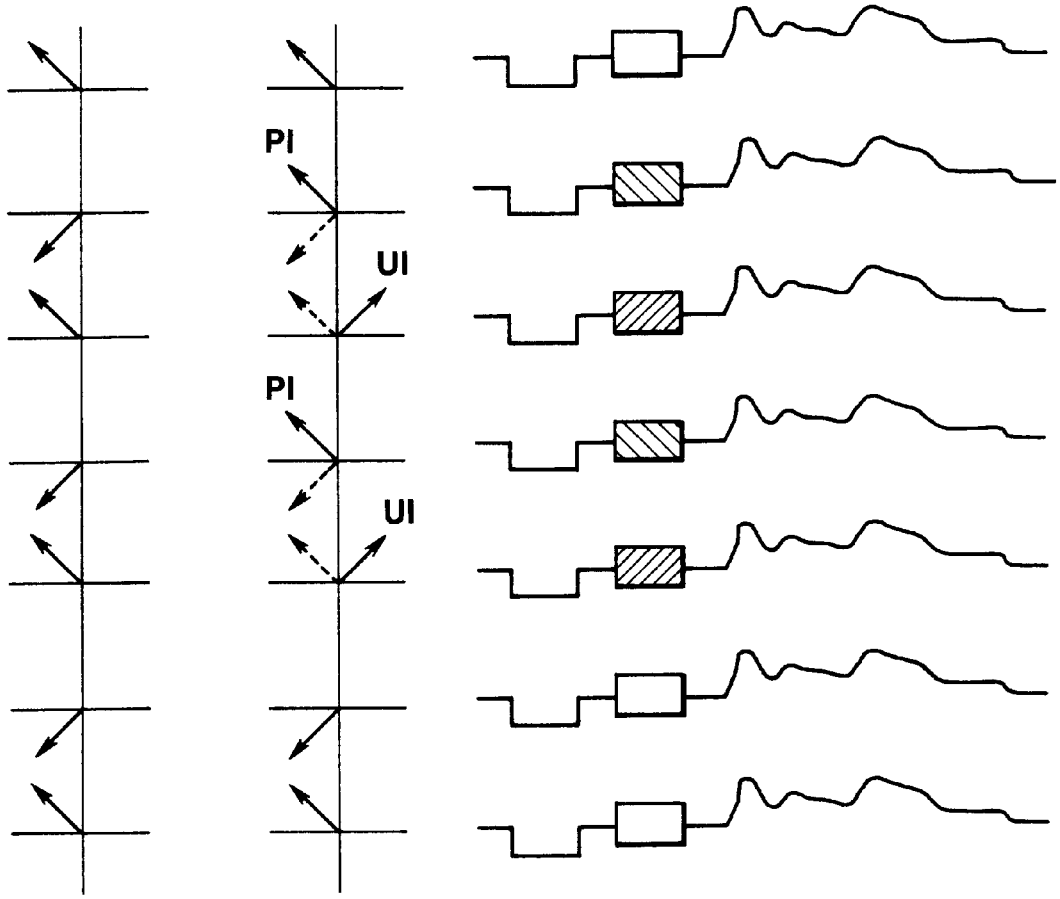
FIG. 8 is a view showing other concrete sequences for outputting color stripe signals on a specific line from the color burst signal generating unit.

The timing generator 9 may be arranged to control the color burst signal generating unit 8 in the color stripe system sequence. For example, as shown in FIG. 8, on the specific four lines, the timing generator 9 may control the color burst signal generating unit 8 to output the color stripe signal composed of an alternate repetition of the V-axis inverted burst signal PI and the U-axis inverted burst signal UI. The specific four lines are located at intervals of about ten to forty lines. As mentioned above, on the specific four lines located at intervals of about ten to forty lines, the color stripe signal composed of an alternate repetition of the V-axis inverted burst signal PI and the U-axis inverted burst signal UI may be added to the color difference signals U and V in place of the normal color burst signal as the copyguard signal. This addition of the color stripe signal makes it possible to supply the high-quality video signal with a copyguard function from illegal copy through the VTR without having to interfere with the image displayed on the TV set.

Figure 9:
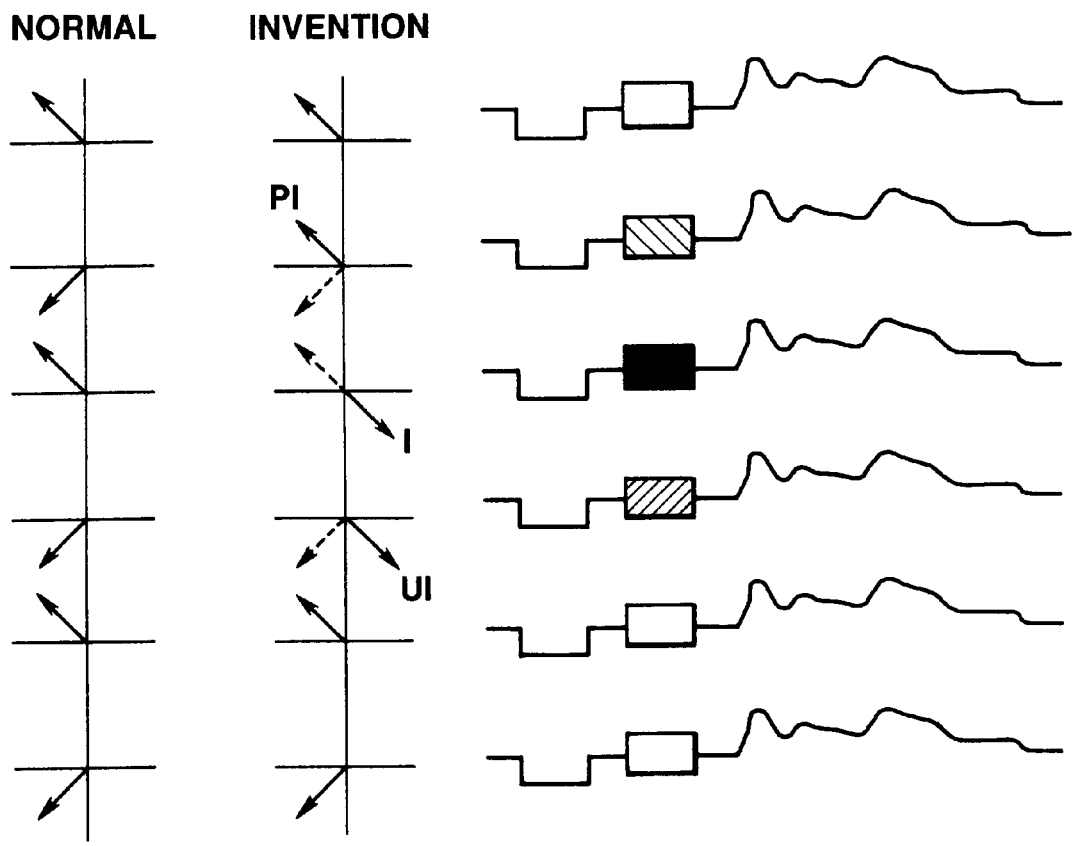
FIG. 9 is a view showing other concrete sequences for outputting color stripe signals on a specific line from the color burst signal generating unit.

The timing generator 9 may be arranged to control the color burst signal generating unit 8 in the color stripe system sequence. For example, as shown in FIG. 9, on the specific three lines, the timing generator 9 may control the color burst signal generating unit 8 to output a color stripe signal composed of a sequential array of the V-axis inverted burst signal PI, the both-axes inverted burst signal I and the U-axis inverted burst signal UI. The specific three lines are located at intervals of about ten to forty lines. The specific three lines are located at intervals of about ten to forty lines. On these specific three lines, the color stripe signal having such a composition may be added to the color difference signals U and V in place of the normal color burst signal as the copyguard signal. This addition of the color stripe signal makes it possible to supply to a high-quality video signal with a reliable copyguard function from illegal copy through the VTR.

Figure 10:
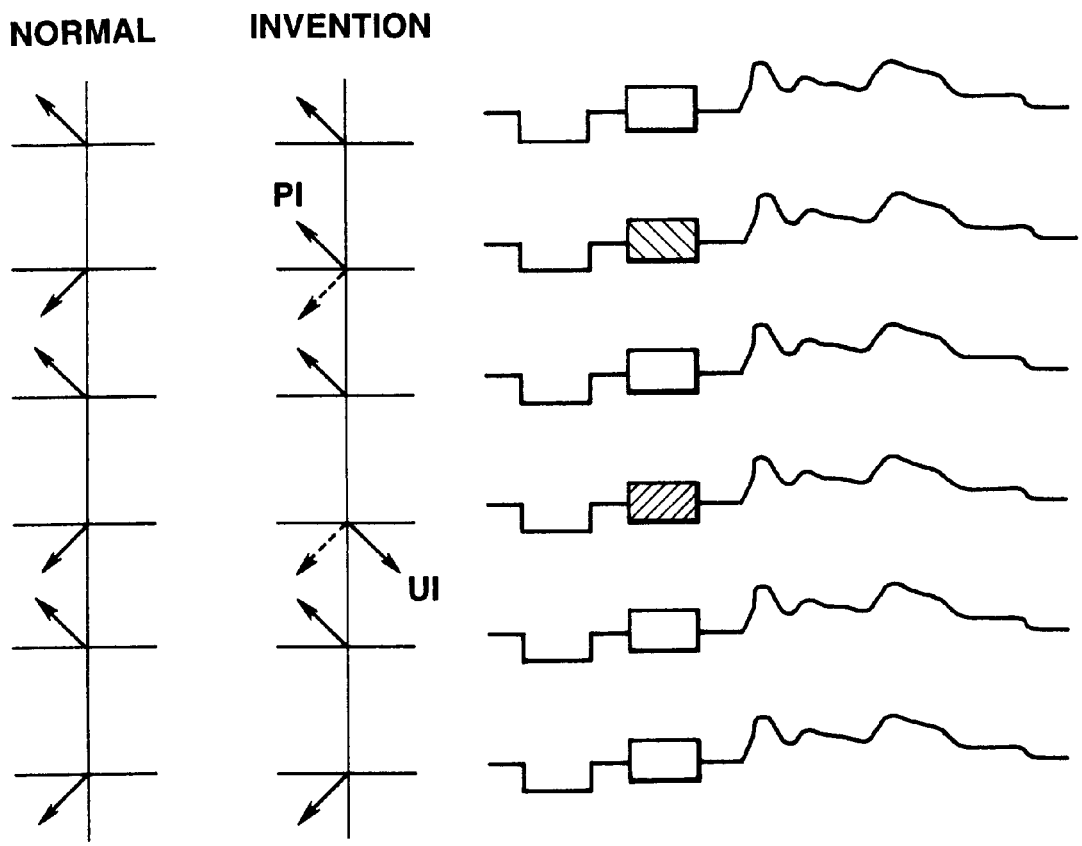
FIG. 10 is a view showing other concrete sequences for outputting color stripe signals on a specific line from the color burst signal generating unit.

Moreover, the timing generator 9 may be arranged to control the color burst signal generating unit 8 in the sequence as shown in FIG. 10. This sequence is a transformation of the sequence shown in FIG. 9. Concretely, the both-axes inverted burst signal I is exchanged with the normal color burst signal in the sequence shown in FIG. 9. That is, on the two lines of the specific three lines located at intervals of about ten to forty lines, the two lines located on both sides of a middle line to which the normal color burst signal is added, the color stripe signal composed of a sequential array of the V-axis inverted burst signal PI and the U-axis inverted burst signal UI may be added to the color difference signals U and V as the copyguard signal in place of the normal color burst signal. This type of addition makes it possible to supply a high-quality video signal with a copyguard function from illegal copy through the VTR.

Figure 11:
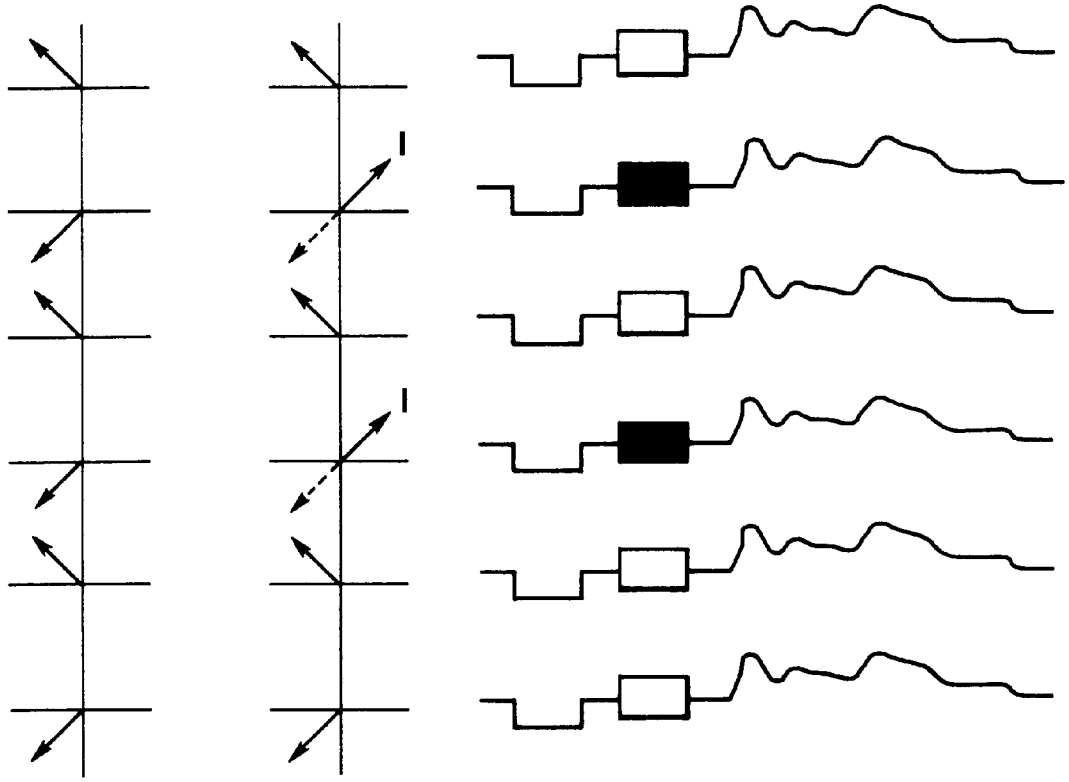
FIG. 11 is a view showing other concrete sequences for outputting color stripe signals on a specific line from the color burst signal generating unit.

The timing generator 9 may control the color burst signal generating unit 8 in the sequence as shown in FIG. 11. This sequence is a transformation of the color stripe system sequence shown in FIG. 10. Concretely, in this sequence, the V-axis inverted burst signal PI and the U-axis inverted burst signal UI are exchanged with the both-axes inverted burst signal I. On the two of the specific three lines located at intervals of about ten to forty lines, the two lines located on both sides of the middle line to which the normal color burst signal is added, the color stripe signal composed of an array of the both-axes inverted burst signals I is added to the color difference signals U and V in place of the normal color burst signal as a copyguard signal. This addition makes it possible to supply a high-quality video signal with a copyguard function from illegal copy through the VTR.

Figure 12:
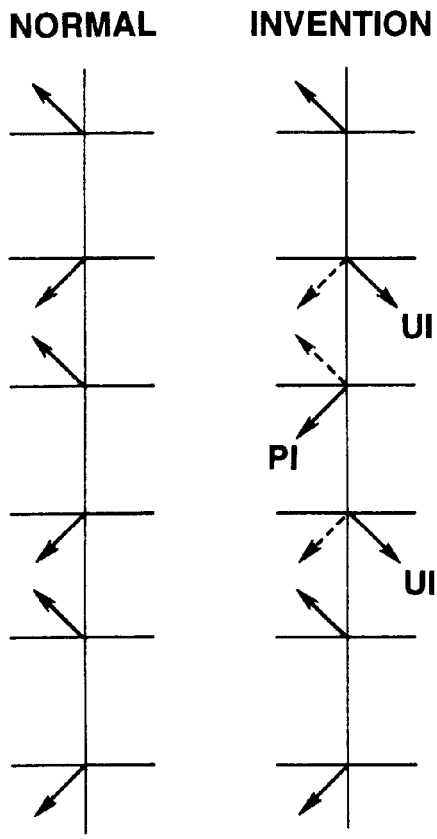
FIG. 12 is a view showing other concrete sequences for outputting color stripe signals on a specific line from the color burst signal generating unit.
Figure 12:
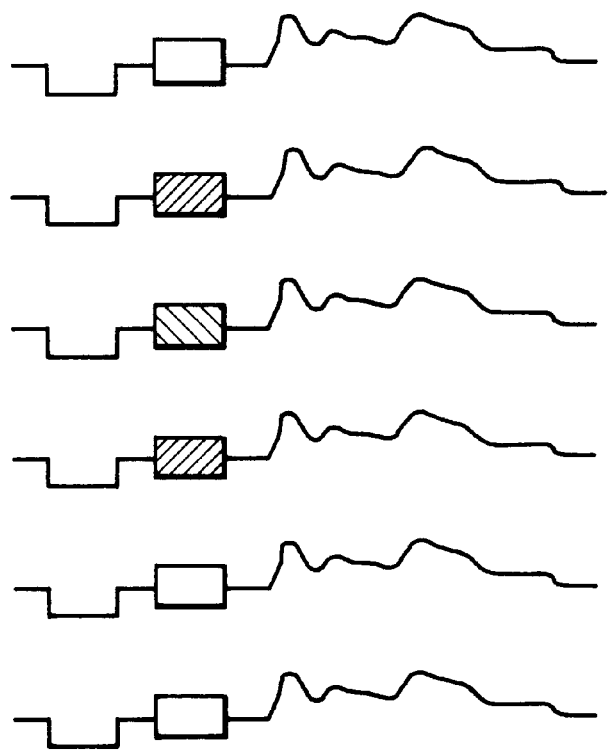

The timing generator 9 may be arranged to control the color burst signal generating unit 8 in the color stripe system sequence. For example, as shown in FIG. 12, on the specific three lines, the timing generator 9 may control the color burst signal generating unit 8 to output the color stripe signal composed of a sequential array of the V-axis inverted burst signal PI, the U-axis inverted burst signal UI and the V-axis inverted burst signal PI. The specific three lines are located at intervals of about ten to forty lines. On these specific lines, the color stripe signal composed of a sequential array of the V-axis inverted burst signal PI, the U-axis inverted burst signal UI and the V-axis inverted burst signal PI may be added to the color difference signals U and V as the copyguard signal in place of the normal color burst signal, for the purpose of supplying a high-quality video signal with a copyguard function from illegal copy through the VTR without interfering with the image displayed on the TV set.

Figure 13:
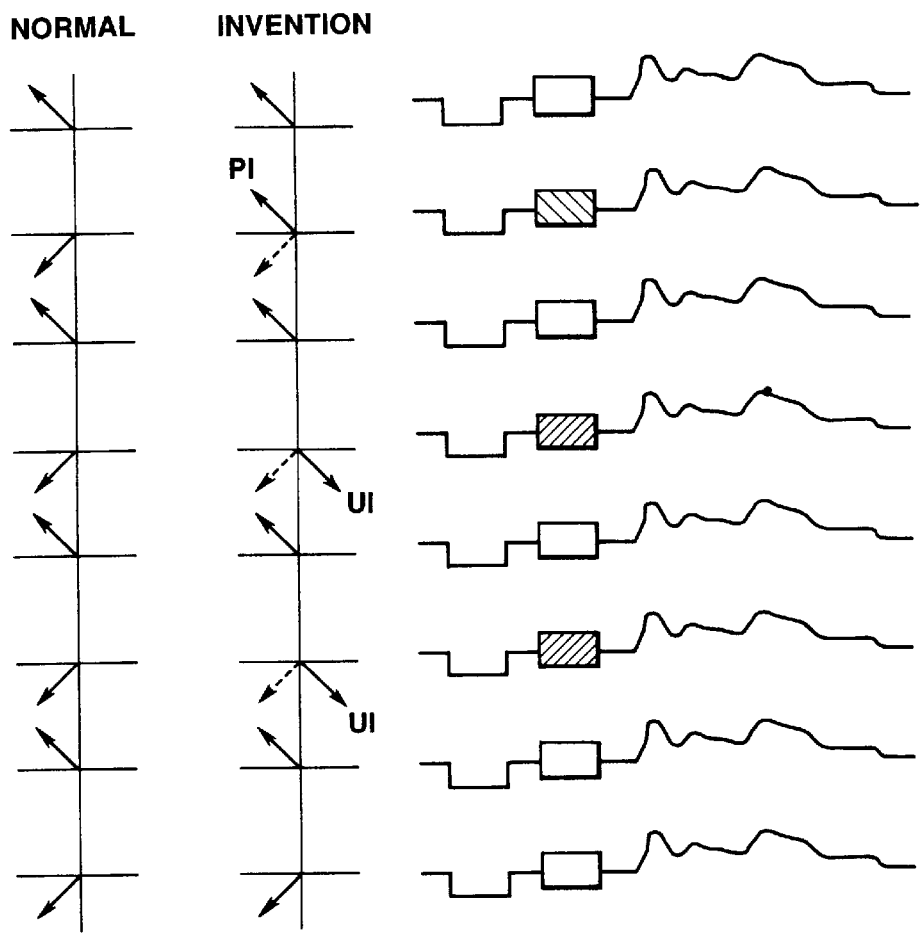
FIG. 13 is a view showing other concrete sequences for outputting color stripe signals on a specific line from the color burst signal generating unit.

The timing generator 9 may control the color burst signal generating unit 8 in the color stripe system sequence. For example, as shown in FIG. 13, on the three lines of the specific five lines, the three lines spaced from each other by one line to which the normal color burst signal is added, the timing generator 9 may control the color burst signal generating unit 8 to supply the color stripe signal composed of a sequential array of the V-axis inverted burst signal PI, the U-axis inverted burst signal UI and the U-axis inverted burst signal UI. These specific five lines are located at intervals of about ten to forty lines. On the three lines of the specific five lines, the color stripe signal composed of a sequential array of the V-axis inverted burst signal UI, the V-axis inverted burst signal UI and the V-axis inverted burst signal PI may be added to the color difference signals U and V as a copyguard signal in place of the normal color burst signal. This addition makes it possible to supply a high-quality video signal with a copyguard function from illegal copy through the VTR without interfering with the image appearing on the TV set.

As described above, the timing generator 9 controls the color burst signal generating unit 8 in the color stripe system sequence at each horizontal scanning period to output the burst signals at least two of the U-axis inverted burst signal UI, the V-axis inverted burst signal PI and the both-axes inverted burst signal I as the color stripe signals for copyguard. At least two of the U-axis inverted burst signal UI, the V-axis inverted burst signal PI and the both-axes inverted burst signal I are used as the color stripe signals for copyguard, which makes it possible to reduce the interference given to the image appearing on the specific TV set.

Figure 14:
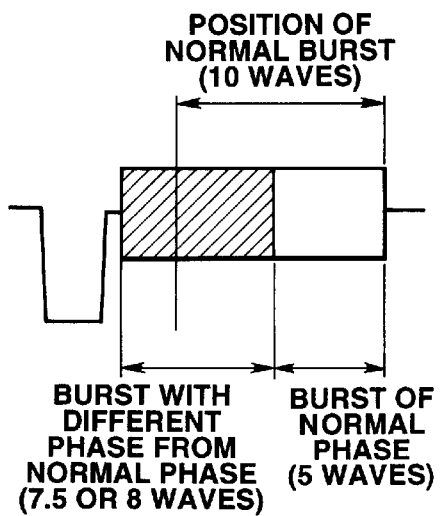
FIG. 14 is a view showing a split burst outputted on a specific line from the color burst signal generating unit.

The timing generator 9 may be arranged to control the color burst signal generating unit 8 in the color stripe system sequence to invert the phase of part of the color burst signal on each of the specific lines. For example, as shown in FIG. 14, the timing generator 9 may control the color burst signal generating unit 8 to generate 7.5 or 8 waves of the color stripe signal having the different phase from the normal color stripe signal and to generate 5 waves of the color burst signal having the normal color stripe signal. This control therefore results in replacing part of the color burst signal on each of the specific lines with the color stripe signal without replacing all the color burst signal on each of the specific lines with the color stripe signal, thereby enabling to supply a high-quality video signal with a copyguard function from illegal copy through the VTR without interfering with the image appearing on the TV set.

Figure 15:
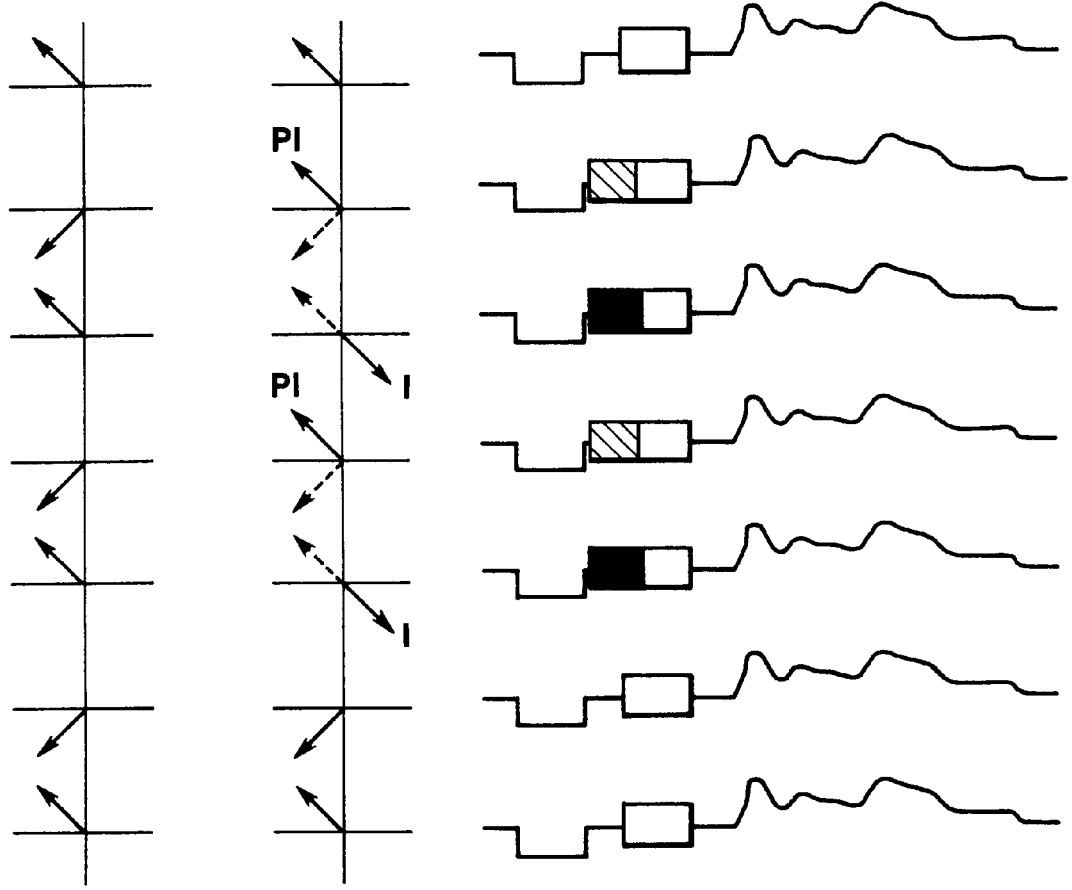
FIG. 15 is a view showing the other concrete sequences for outputting color stripe signals on a specific line from the color burst signal generating unit.

That is, the timing generator 9 may be arranged to control the color burst signal generating unit 8 in the color stripe system sequence. For example, as shown in FIG. 15, on the control, a split burst signal is added to each of the specific four lines. The color stripe signal composed of an alternate array of the V-axis inverted burst signal PI and the both axes inverted burst signal I is outputted to a first half portion of the color burst signal on each line. The specific four lines are located at intervals of about ten to forty lines. The split burst signals are added to these specific four lines so that the color stripe signal composed of an alternate array of the V-axis inverted burst signal PI and the both-axes inverted burst signal I is added to the color difference signals U and V as the copyguard signal in place of the normal color burst signal. This addition makes it possible to supply a high-quality video signal with a copyguard function from illegal copy through the VTR without interfering with the image appearing on the TV set.

In the case of applying the split burst signals, at least two of the U-axis inverted burst signal UI, the V-axis inverted burst signal PI and the both-axes inverted burst signal I may be used as the color stripe signals for copyguard, which makes it possible to reduce the interference given to the image appearing on the specific TV set.

The digital video disk 1 has been arranged to set the trigger bits of the CGMS as two bits and specify two kinds of analog copy limiting process, that is to say, the pseudo horizontal synchronous pulse system and the color stripe system. However the increase of the bits makes it possible to specify the selective generation of multiple kinds of color stripe signals.

The apparatus for processing a video signal according to the present invention is arranged so that the signal generating unit may generate a copyguard signal having the different phase from the original phase of the color burst signal of the video signal, the copyguard signal composed of at least two kinds of modulations of the burst phase. The copyguard signal is exchanged with the color burst signal of the video signal through the effect of the switch. This makes it possible for the apparatus to supply a high-quality video signal with a copyguard function from illegal copy through the VTR without interfering with the image displayed on the TV set.

The apparatus for processing a video signal according to the present invention is arranged so that the signal generating unit alternately outputs the U-axis inverted burst signal produced by inverting the U-axis component of the burst phase and the V-axis inverted burst signal produced by inverting the V-axis component as a copyguard signal at each horizontal scanning period. This arrangement therefore makes it possible to reduce the interference given to the image displayed on the TV set and reliably prevent illegal copy through the VTR without interfering with the image displayed on the specific TV set.

The apparatus for processing a video signal according to the present invention is arranged so that the signal generating unit alternately outputs the one-axis inverted burst signal produced by inverting one of the U-axis component and the V-axis component of the burst phase and the both axes inverted burst signal produced by inverting the U-axis and the V-axis inverted components of the burst phase as the copyguard signal at each horizontal scanning period. This arrangement therefore makes it possible to reduce the interference given to the image displayed on the specific TV set and reliably prevent illegal copy through the VTR without interfering with the image displayed on the TV set.

The apparatus for processing a video signal according to the present invention is arranged so that the signal generating unit sequentially outputs the U-axis inverted burst signal produced by inverting the U-axis component of the burst phase, the V-axis inverted burst signal produced by inverting the V-axis component and the U-axis/V-axis inverted burst signal produced by inverting the U-axis/V-axis at each horizontal scanning period. This arrangement therefore makes it possible to reduce the interference given to the image displayed on the specific TV set and reliably prevent illegal copy through the VTR without interfering with the image displayed on the TV set.

The apparatus for processing a video signal according to the present invention is arranged so that the selector replaces all the color burst signal with the copyguard signal at each horizontal scanning period. The arrangement therefore makes it possible to prevent illegal copy through the VTR without interfering with the image displayed on the TV set.

The apparatus for processing a video signal according to the present invention is arranged so that the selector replaces part of the color burst signal with the copyguard signal at each horizontal scanning period. This arrangement therefore makes it possible to reliably prevent illegal copy through the VTR without interfering with the image displayed on the TV set.

The apparatus for processing a video signal according to the present invention is arranged so that the selector replaces the color burst signal with the copyguard signal at each alternate horizontal scanning period with one middle horizontal scanning period of the normal burst phase laid therebetween. The arrangement therefore makes it possible to reliably prevent illegal copy through the VTR without interfering with the image displayed on the TV set.

The method for processing a video signal according to the present invention is arranged to generate a copyguard signal composed of a combination of at least two kinds of modulations of the burst phase, the copyguard signal having the different phase from the original phase of the color burst signal of the video signal, and replace the color burst signal of the video signal with the copyguard signal. The arrangement therefore makes it possible to reliably prevent illegal copy through the VTR without interfering with the image displayed on the TV set.

The method for processing a video signal according to the present invention is arranged to select at least two of the U-axis inverted burst signal produced by inverting the U-axis component of the burst phase, the V-axis inverted burst signal produced by inverting the V-axis component and the both-axes inverted burst signal produced by inverting the U-axis/V-axis component at each horizontal scanning period and replace the color burst signal of the video signal with the copyguard signal. This arrangement therefore makes it possible to reliably prevent illegal copy through the VTR.

The method for processing a video signal according to the present invention is arranged to replace part of all of the color burst signal with the copyguard signal at each horizontal scanning period. This arrangement therefore makes it possible to reliably prevent illegal copy through the VTR without interfering with the image displayed on the TV set.

Further, the method for processing a video signal according to the present invention is arranged so that the color burst signal is replaced with the copyguard signal at each alternate horizontal scanning period with one middle horizontal scanning period of the normal burst phase, thereby enabling to reliably prevent illegal copy through the VTR without interfering with the image displayed on the TV set.

The recording medium according to the present invention includes a recording medium for recording the video signal and a control area for recording control information for copyguard. The recording medium operates to record on the control area the control information for specifying selection of at least two of the U-axis inverted burst signal produced by inverting the U-axis component of the burst phase, the V-axis inverted burst signal produced by inverting the V-axis component, and the both-axes inverted burst signal produced by inverting the U-axis/V-axis as the copyguard signal at each horizontal scanning period and replacing the color burst signal with the selected signal. When the video signal is reproduced from the recording area, the recording medium so arranged makes it possible to reliably prevent illegal copy through the VTR without interfering with the image displayed on the TV set.

What is claimed is:

1. An apparatus for processing a video signal for limiting recording of a video signal for an analog output from a video signal source, comprising:

means for generating a copyguard signal;

selector means for replacing a color burst signal of said video signal with said copyguard signal; and wherein said signal generating means operates to generate said copyguard signal composed of at least two kinds of modulations of a first phase, said two kinds of modulations comprising at least two of a U-axis inverted burst signal produced by inverting a U-axis component of a burst phase, a V-axis inverted burst signal produced by inverting a V-axis component, and a both-axes inverted burst signal produced by inverting a U-axis/V-axis as a copyguard signal at each horizontal scanning period, said copyguard signal having a different phase from an original phase of said color burst signal of said video signal.

2. The apparatus for processing a video signal as claimed in claim 1, wherein said signal generating means operates to alternately output a U-axis inverted burst signal produced by inverting a U-axis component of said burst phase and a V-axis inverted burst signal produced by inverting a V-axis component of said burst phase as said copyguard signal at each horizontal scanning period.

3. The apparatus for processing a video signal as claimed in claim 1, wherein said signal generating means operates to alternately output a one-axis inverted burst signal produced by inverting one of a U-axis component and a V-axis component of said burst phase and a V-axis inverted burst signal produced by inverting a V-axis component as said copyguard signal at each horizontal scanning period.

4. The apparatus for processing a video signal as claimed in claim 1, wherein said signal generating means operates to sequentially output a U-axis inverted burst signal produced by inverting a U-axis component of said burst phase, a V-axis inverted burst signal produced by inverting a V-axis component of said burst phase, and a both-axes inverted burst signal produced by inverting both of the U-axis/V-axis as said copyguard signal at each horizontal scanning period.

5. The apparatus for processing a video signal as claimed in claim 1, wherein said selector means operates to replace all of said color burst signal with said copyguard at each horizontal scanning period.

6. The apparatus for processing a video signal as claimed in claim 1, wherein said selector means operates to replace part of said color burst signal with said copyguard signal at each horizontal scanning period.

7. The apparatus for processing a video signal as claimed in claim 1, wherein said selector means operates to replace said color burst signal with said copyguard signal at each alternate horizontal scanning period with one middle horizontal scanning period of the normal burst phase laid therebetween.

8. A method for processing a video signal, for limiting recording of a video signal for an analog output from a video signal source, comprising the steps of:

generating a copyguard signal composed of at least two kinds of modulations of a burst phase, said copyguard signal having a different phase from an original phase of said color burst signal of said video signal, said two kinds of modulations comprising at least two of a U-axis inverted burst signal produced by inverting a U-axis component of a burst phase, a V-axis inverted burst signal produced by inverting a V-axis component, and a both-axes inverted burst signal produced by inverting a U-axis/V-axis as a copyguard signal at each horizontal scanning period; and replacing said color burst signal of said video signal with said copyguard signal.

9. The method for processing a video signal as claimed in claim 8, wherein at least two of a U-axis inverted burst signal produced by inverting a U-axis component of said burst phase, a V-axis inverted burst signal produced by inverting a V-axis component of said burst signal, and a both-axes inverted burst signal produced by inverting the U-axis/V-axis components are selected as said copyguard signal at each horizontal scanning period and then is exchanged with said color burst signal of said video signal.

10. The method for processing a video signal as claimed in claim 8, wherein said copyguard signal is exchanged with part or all of said color burst signal at each horizontal scanning period.

11. The method for processing a video signal as claimed in claim 10, wherein said copyguard signal is exchanged with said color burst signal at each alternate horizontal scanning period with one middle horizontal scanning period of the normal burst phase laid therebetween.

12. A recording medium having a recording area for recording a video signal and a control area for recording control information for copyguarding a video signal reproduced from said recording area, characterized in that said control area records control information for specifying selection of at least two of a U-axis inverted burst signal produced by inverting a U-axis component of a burst phase, a V-axis inverted burst signal produced by inverting a V-axis component, and a both-axes inverted burst signal produced by inverting a U-axis/V-axis as a copyguard signal at each horizontal scanning period and specifying replacement of said color burst signal of said video signal with said copyguard signal.

* * * * *